US006796924B2

(12) United States Patent
Shimizu et al.

(10) Patent No.: US 6,796,924 B2
(45) Date of Patent: Sep. 28, 2004

(54) ENGINE REVOLUTION CONTROLLING APPARATUS

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/216,191

(22) Filed: Aug. 12, 2002

(65) Prior Publication Data

US 2003/0045397 A1 Mar. 6, 2003

(30) Foreign Application Priority Data

Sep. 4, 2001 (JP) ....................................... 2001-267624

(51) Int. Cl.[7] ............................... H02P 1/00; H02P 9/04

(52) U.S. Cl. ............................ 477/7; 290/40 A; 290/51

(58) Field of Search ............................ 477/107, 7, 902, 477/30; 290/40 C, 40 F, 40 A, 51

(56) References Cited

U.S. PATENT DOCUMENTS 4,395,199 A * 7/1983 Izumi et al. .................. 417/53
5,421,440 A * 6/1995 Kumagai ..................... 192/90
5,845,619 A * 12/1998 Reichlinger ................. 123/350
6,130,486 A 10/2000 Shimizu et al. ........... 290/40 C
6,301,543 B2 * 10/2001 Fujiwara et al. ............ 701/114
6,347,275 B1 * 2/2002 Nakano ....................... 701/104
6,491,604 B1 * 12/2002 Katou et al. ................ 477/154

FOREIGN PATENT DOCUMENTS

EP 737807 A2 * 10/1996 ........... F02D/41/26
JP 5-018285 1/1993
JP 11-308896 11/1999

* cited by examiner

*Primary Examiner*—Tisha D Lewis
(74) *Attorney, Agent, or Firm*—Westerman, Hattori, Daniels & Adrian, LLP

(57) ABSTRACT

An electronic engine-governor control is carried out using no arithmetic tables and thus relieving a load to the CPU. A throttle opening is controlled with a control quantity to suppress a difference between the actual revolutions and the target. Calculator 107A is provided for calculating the difference D between the current revolutions and the target Ne(tgt). The difference D is corrected with an adjustment A based on a difference between the current revolutions Ne(0) and the previous revolutions Ne(−1)and an adjustment B based on a difference between the previous revolutions Ne(−1) and the revolutions before previous revolutions Ne(−2). Calculator 107B is provided for calculating an adjustment E in relation to a load from the throttle opening θTH(0) and the target Ne(tgt). Calculator 107C is provided for calculating D/E, the throttle controlling signal PθTH.

1 Claim, 2 Drawing Sheets

ENGINE REVOLUTION CONTROLLING APPARATUS

BACKGROUND OF THE INVENTION

1. Field of the Invention

The present invention relates to an engine revolution controlling apparatus and particularly to an apparatus for controlling the revolution of an engine in relation to loads.

2. Description of the Related Art

Most engine generators for use as alternating current sources have increasingly been provided with an inverter for stabilizing the output frequency. Such an engine generator is driven by an engine to generate an alternating current which is converted into a direct current and then supplied to an inverter for output at a commercial frequency. The output of the generator linked with the inverter is hardly affected in the frequency by the number of revolutions of the engine and can thus be determined corresponding to the load by controlling the number of revolutions of the engine.

For example, an inverter system engine generator is disclosed in Japanese Patent Laid-open Publication (Heisei) 5-18285 where the load is detected from a current output of its inverter and used for controlling the throttle opening in the engine. This controlling manner allows the voltage output of the generator to remain substantially uniform regardless of any fluctuation in the load.

More specifically, a control signal is generated by a central processing unit (CPU) from a difference signal between the target number of revolutions and the current (actual) number of revolutions and a signal representing a changing speed of a number of revolutions and then used for controlling the throttle opening to provide a desired amount of fuel. The applicants, have developed and proposed a controlling apparatus for an engine which drives a generator where the throttle opening is controlled or varied so that the conduction angle of semiconductors in a converter for rectifying the alternating current output of the generator remains at its predetermined level (as disclosed in Japanese Patent Laid-open Publication (Heisei)11-308896).

The conventional controlling apparatus for an engine includes a table which carries a list of parameters for calculating a desired level of the throttle opening. The desired level of the throttle opening in the table is determined from the difference signal and the changing speed signal of the revolutions.

For controlling the operation of the engine with the use of the table in consideration of any load to the engine, a procedure of processing various data or parameters including the throttle opening is necessary. As the number of parameters increases, the table becomes large in the size and intricate in the architecture. This increases a load to the CPU (providing difficulties for the controlling action). As a result, the controlling action for stabilizing the operation of the engine in consideration of the load will decline the stability. Also, if the CPU is loaded with too many data to be processed, its action may disturb another controlling action. For avoiding such a disturbance, the CPU itself has to be improved in the speed of operation for increasing the processing capability.

SUMMARY OF THE INVENTION

The present invention has been developed in view of the above aspects and its object is to provide an engine revolution controlling apparatus which can ensure a stable action of the engine in consideration of any load without increasing the load to the CPU.

The first feature of this invention is an engine revolution controlling apparatus having a fuel supply controlling means for controlling a supply of fuel so that a difference between the actual number of revolutions and the target number of revolutions in the engine is converged at zero, characterized wherein the fuel supply controlling means comprises a throttle valve driven by a stepping motor and a central processing unit for calculating a control quantity of the stepping motor, the central processing unit including a means for correcting the difference between the target number of revolutions and the current number of revolutions with an adjustment based on a difference between the current number of revolutions and the previous number of revolutions and a difference between the previous number of revolutions and the number before previous number of revolutions and a means for determining the control quantity based on the corrected difference.

According to the first feature, a control quantity is calculated based on the target revolution of the engine, actual revolution, and past engine revolutions. The control quantity is calculated based on the parameters by using arithmetic operation with the equations.

The second feature of this invention is that the central processing unit includes an adjustment calculating means for dividing the control quantity by a subtraction of at least a function of either the throttle opening or the actual number of revolutions of the engine from a predetermined gain. According to the second feature, the control quantity is corrected responding to the load which is represented by the throttle opening and the target number of revolution of the engine.

DETAILED DESCRIPTION OF THE PREFERRED EMBODIMENTS

Figure 2:
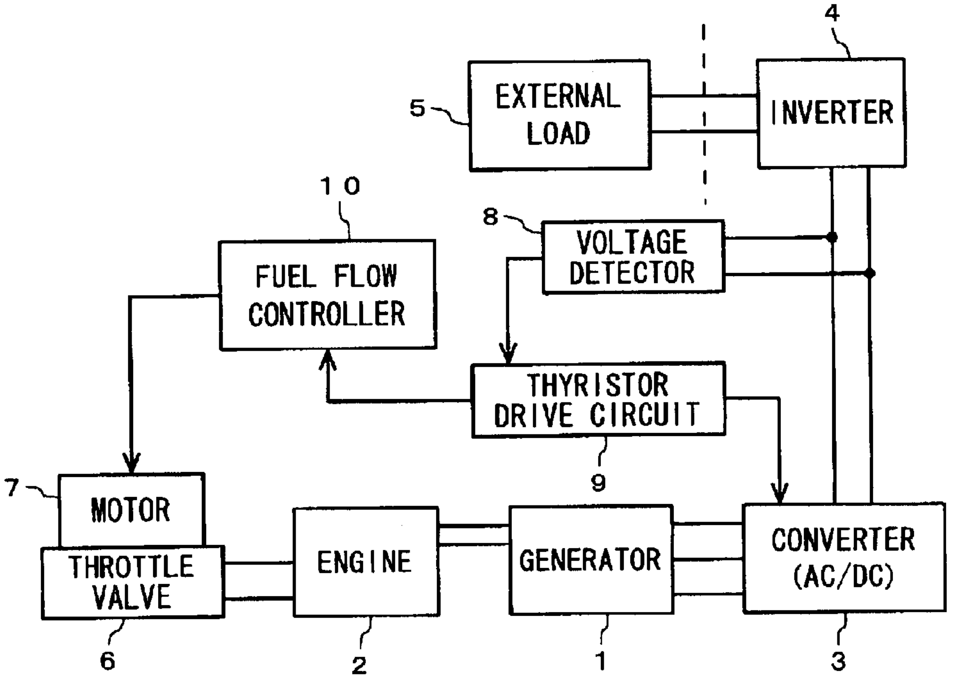
FIG. 2 is a block diagram of an engine generator equipped with the controlling apparatus of the embodiment.

One embodiment of the present invention will be described in more detail referring to the relevant drawings. FIG. 2 is a block diagram showing an arrangement of an engine generator equipped with a controlling apparatus of the embodiment of the present invention. A magnetic multipole generator 1 (referred to as a generator hereinafter) is linked to an internal combustion engine 2. The generator 1, driven by the engine 2 generates a multi-phase (namely three-phase) alternating current. A converter 3 is also provided which includes a rectifying circuit composed mainly of semiconductor devices or thyristors connected in a bridge form. The alternating current generated by the generator 1 is thus converted into a direct current by a full-wave rectifying action of the converter 3. The direct current is received by an inverter 4. The inverter 4 converts the direct current into a single-phase alternating current at a commercial frequency (e.g. 50 Hz) which is then supplied to an external load 5.

The engine 2 includes a throttle valve 6 which is driven by a stepping motor 7. The opening of the throttle valve 6 is controlled by a pulse signal provided from a fuel flow controller 10 to the stepping motor 7. As the engine 2 receives a supply of fuel determined by the throttle opening, it runs at a desired number of revolutions.

The direct current voltage output of the converter 3 is measured by a voltage detector 8. The measurement of the voltage output is compared with a predetermined target voltage (e.g. 170 V) by a thyristor drive circuit 9. The thyristor drive circuit 9 then controls the conduction angle of the thyristors in the converter 3 through a known manner so that the voltage output measurement of the converter 3 is converged at the target voltage. As a result, the voltage output of the converter 3 remains equal to the target voltage within a range of the current output corresponding to the controllable range of the conduction angle of the thyristors.

Figure 3:
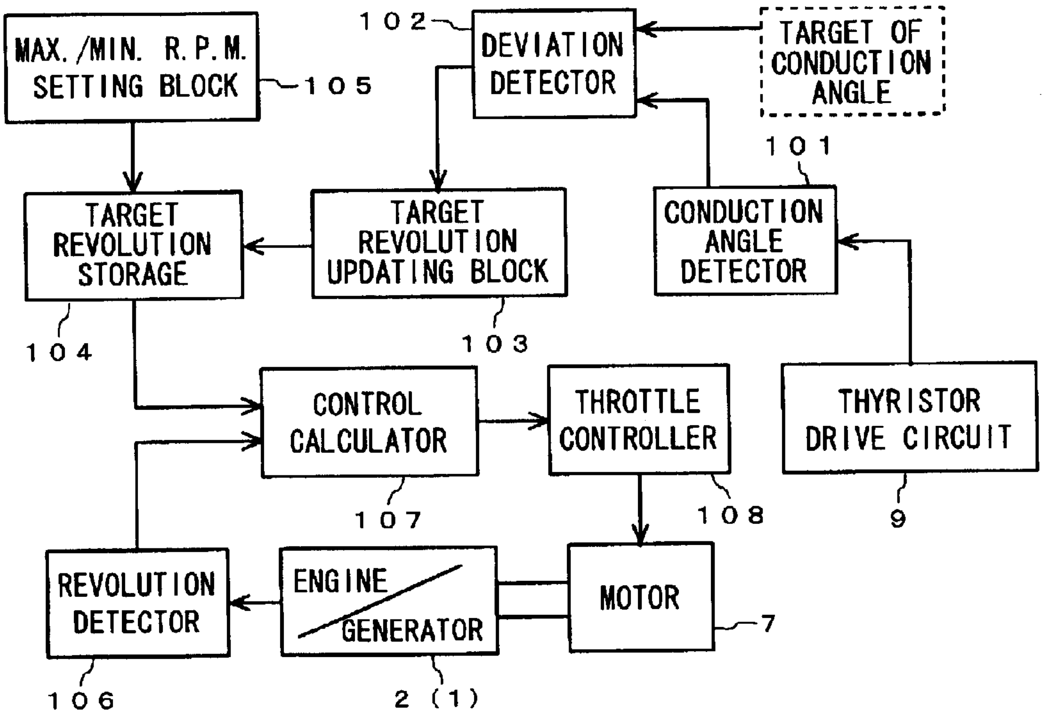
FIG. 3 is a block diagram of a fuel controller in the controlling apparatus of the embodiment.

FIG. 3 is a block diagram showing a function of the fuel flow controller 10. A thyristor conduction angle detector 101 detects the conduction angle on the basis of a control signal supplied from the thyristor drive circuit 9 to the converter 3. The conduction angle is continuously measured at predetermined periods to have an average. The average conduction angle may preferably be determined from a moving average of consecutive data (e.g. of 10 times).

The average conduction angle determined by the thyristor conduction angle detector 101 is then supplied to a deviation detector 102 for detecting a deviation from the target conduction angle. The deviation is used to judge whether or not the generator 1 runs with ample margins of its output. For that purpose, the target conduction angle may be set to 80 percent. It is preferred that the target conduction angle is hysteretic as in a common control parameter. The target conduction angle may be a fixed value or may be varied depending on the temperature of the engine 2. For example, when the temperature of the engine 2 is low, the target conduction angle is set at a small degree. In this manner, the engine 2 is favorably controlled in the revolution so that the deviation detected by the deviation detector 102 is zero and can thus be maintained in its generous state.

A target revolution updating block 103 is responsive to the deviation received from the deviation detector 102 to generate and deliver an engine revolution adjustment. A target revolution storage 104 adds the engine revolution adjustment received from the target revolution updating block 103 to the target revolution, which has been saved therein, in order to have a new target revolution. The target revolution is updated while not departing from the range of engine revolution between maximum and minimum which has been determined by a maximum/minimum revolution setting block 105. More particularly, in case that the target revolution calculated by adding the engine revolution adjustment departs from the range, the maximum or minimum of the range is assigned as a new target revolution. The minimum range is used because the conduction angle of the thyristors particularly at a lower rate of the revolution may be susceptible to every small change in the revolution. As such drawback is avoided, the stable revolution of the engine can be ensured without or with a small load.

A revolution detector 106 detects the revolution of the generator 1. A control calculator 107 calculates a control quantity, which suppresses the deviation of the real revolution from the target revolution to zero, from the real revolution received from the revolution detector 106 and the target revolution read out from the target revolution storage 104, using a known appropriate method (for example, proportion, integral, and differential calculation). The calculation by the control calculator 107 is described later. A throttle controller 108 includes a stepping motor 7 and generates a train of pulses for driving the stepping motor 7 corresponding to the control received from the control calculator 107. The stepping motor 7 rotates in response to the pulses to change the throttle opening.

An arithmetic formula used in the control calculator 107 will now be explained. The throttle control PθTH supplied as a control quantity to the stepping motor is calculated from Equation (1), $$P\theta TH=D/E \tag{1}$$

where D is a deviation and E is an adjustment which both are determined from Equations (2) and (3) respectively, $$D=\text{target number of revolutions } Ne(tgt)-\text{current number of revolutions } Ne(0)-A+B-C \tag{2}$$

$$E=b-(\text{throttle opening } \theta TH(0)/c)-(\text{target number of revolutions } Ne(tgt)/d) \tag{3}$$

Namely, the deviation D is a difference between the target number of revolutions Ne(tgt) and the current number of revolutions Ne(0) corrected with three adjustments A, B, and C. The adjustments A, B, and C are based on the current number of revolutions and the past number of revolutions. The adjustment A is a function of a difference between the current number of revolutions Ne(0) and the previous number of revolutions Ne(−1). The adjustment B is a function of a difference between the previous number of revolutions Ne(−1) and the number before previous number of revolutions Ne(−2). Either represents a change in the number of revolutions which is added with a convergence factor. The adjustment C is a function of a difference between the current number of revolutions Ne(0) and the past numbers of revolutions Ne(−a) and Ne(−2a) representing a fluctuation during a considerable length of time. The adjustment C is based on the past numbers of revolutions Ne(−a) and Ne(−2a) measured at the former calculation. The adjustments A, B, and C are calculated from Equations (4), (5), and (6) respectively.

$$A=\alpha(Ne(0)-Ne(-1)) \tag{4}$$

$$B=\beta(Ne(-1)-Ne(-2)) \tag{5}$$

$$C=\gamma(Ne(0)-2Ne(-a)+Ne(-2a))/64 \tag{6}$$

In Equation 3 for calculating the adjustment E, the greater the throttle opening θTH(0) or the target number of revolutions Ne (tgt), the smaller the adjustment E becomes. When the adjustment E decreases, the throttle control PθTH can be increased as calculated from Equation 1.

In other words, when the throttle opening θTH is greater (i.e. the load is high) or the target number of revolutions is higher, the throttle control PθTH becomes high thus increasing the movement of the throttle valve 6 (a large gain). When the throttle opening θTH is smaller (i.e. the load is low) or the target number of revolutions is lower, the throttle control PθTH becomes low thus decreasing the movement of the throttle valve 6 (a small gain).

The arithmetic operation of Equation 2 is implemented by a comparison method while those of Equations 4 to 6 are implemented by differential methods. As the action of the throttle valve 6 controlled by the stepping motor 7 is based on an integral method, the overall action of controlling the number of engine revolutions can be implemented by a known PID technique including comparison, integration, and differentiation.

The coefficients α, β, and γ in the above equations are generally determined through a series of experiments depending on the type of the engine or the purpose of the generator system. Also, the variables a, b, c, and d are predetermined values.

The adjustments A, B, and C may not be used together. For example, if a fluctuation during a considerable length of time is disregarded, the coefficient $\gamma$ may be set to zero hence allowing no use of the adjustment C.

Figure 1:
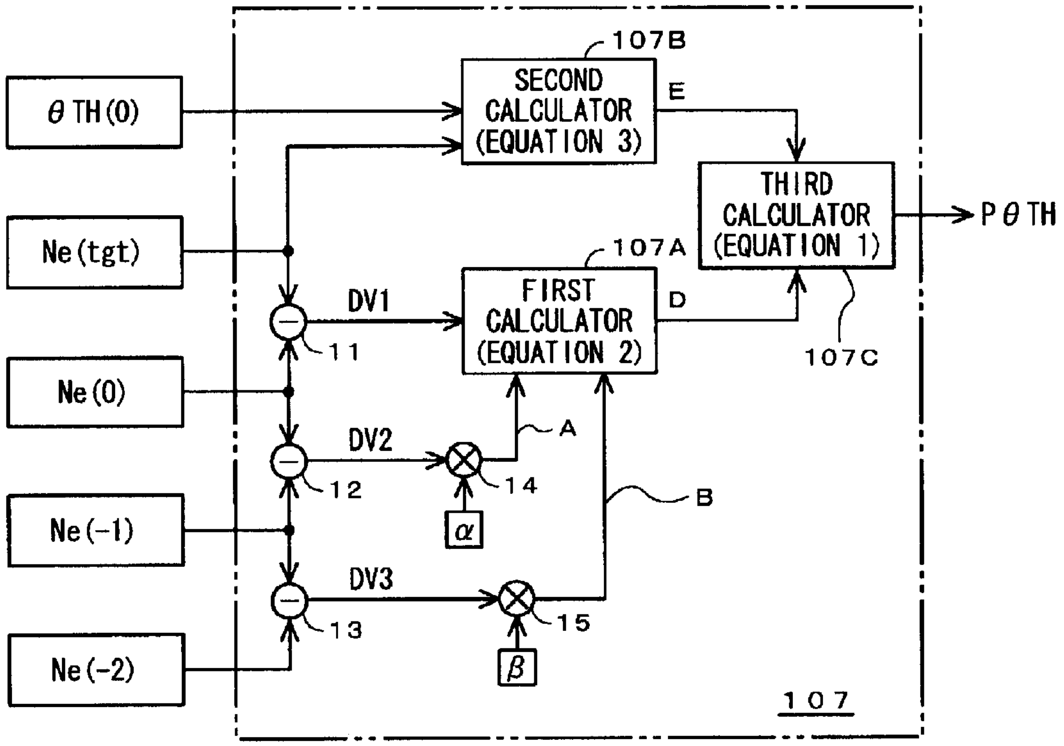
FIG. 1 is a block diagram of a primary calculating part of a controlling apparatus according to an embodiment of the present invention.

FIG. 1 is a block diagram of a primary part of the control calculator 107. As shown, a first calculator 107A is provided for determining the difference D between the target number of revolutions Ne (tgt) and the current number of revolutions Ne(0) from Equation 2 using the two adjustments A and B which compensate a change in the engine revolution. The adjustment C is not used in this example. More specifically, a (first) difference DV1 between the target number of revolutions Ne(tgt) and the current number of revolutions Ne(0) is calculated by a subtracter 11. Similarly, a (second) difference DV2 between the current number of revolutions Ne(0) and the previous number of revolutions Ne(−1) is calculated by a subtracter 12. A (third) difference DV3 between the previous number of revolutions Ne(−1) and the number before previous number of revolutions Ne(−2) is calculated by a subtracter 13. A multiplier 14 is provided where the second difference DV2 is multiplied by the coefficient $\alpha$. Similarly, a multiplier 15 is provided where the third difference DV3 is multiplied by the coefficient $\beta$.

A second calculator 107B is provided for determining the adjustment E as a function of the current throttle opening θTH(0) and the target number of revolutions Ne(tgt) from Equation 3. A third calculator 107C is provided for determining the throttle control PθTH from the difference D calculated by the first calculator 107A and the adjustment E calculated by the second calculator 107B using Equation 1. The throttle control PθTH is supplied to the stepping motor 7 as a pulse signal for determining the angle of movement of the stepping motor 7.

An example of the throttle control PθTH calculated from the above equations will be explained. It is now assumed that the target number of revolutions Ne(tgt) is 3500 rpm, the current number of revolutions Ne(0) is 2500 rpm, the previous number of revolutions Ne(−1) is 2400 rpm, and the number before previous number of revolutions Ne (−2) is 2400 rpm. It is also assumed that the coefficients are $\alpha$=20, $\beta$=5, b=155, and d=64. Using Equation 2, the difference D is calculated from 3500−2500−20×(2500−2400)+5×(2400−2400)=800.

Using Equation 3, the adjustment E is calculated from 155−(3500/64)=95. It is noted that the calculation of the adjustment E is based substantially on the target number of revolutions.

Finally using Equation 1 where the difference D is divided by the adjustment E, 800/95=8.0 is given as the number of pulses or the throttle control PθTH which is used for controlling the stepping motor. Any fraction produced from the division in Equation 1 may be discarded depending on the condition of the engine.

Accordingly, this embodiment allows the control quantity for the stepping motor 7 to be calculated using the equations or statements of arithmetic values with no help of arithmetic tables while relieving any load to the CPU. Also, as its gain control is carried out using appropriate adjustments, the action of controlling the engine can be improved in consideration with a change in the number of revolution and a load to the engine.

As apparent from the above description, the feature of the present invention defined in claim 1 involves the controlling of the throttle opening for the engine with the central processing unit where the arithmetic operation is processed with no use of tables. This permits the central processing unit to be less loaded during the arithmetic operation. Also, a combination of the comparison for calculating a difference between the target number of revolutions and the current number of revolution, the differentiation for calculating a change in the number of revolutions from the past measurements of revolution, and the integration for controlling the action of the throttle valve with the control quantity constitutes a PID controlling action thus ensuring the stability of the engine operation and the traceablity to any abrupt change in the load.

As defined in claim 1, the feature of the present invention allows the state of being loaded to be carefully monitored through measurements of the throttle opening and the number of revolutions thus providing a precise action of the gain control.

What is claimed is:

1. An engine revolution controlling apparatus having a fuel supply controlling means for controlling a supply of fuel so that a difference between an actual number of revolutions and a target number of revolutions in the engine is converged at zero, characterized wherein the fuel supply controlling means comprises a throttle valve driven by a stepping motor and a central processing unit for calculating a control quantity of the stepping motor, the central processing unit including a means for correcting the difference between the target number of revolutions and the actual number of revolutions with an adjustment based on a difference between the actual number of revolutions and a previous number of revolutions and a difference between the previous number of revolutions and a number before the previous number of revolutions and a means for determining the control quantity based on the corrected difference;

wherein the central processing unit includes an adjustment calculating means for dividing the control quantity by a subtraction of at least a function of either a throttle opening or the actual number of revolutions of the engine from a predetermined gain.

* * * * *